United States Patent
Weyrich et al.

(10) Patent No.: US 7,275,071 B2
(45) Date of Patent: Sep. 25, 2007

(54) METHOD OF DISTRIBUTING CONTENT INFORMATION OVER A BROADCAST FILE SYSTEM

(75) Inventors: Jeffrey S. Weyrich, Duluth, GA (US); Nitin K. Gupta, Lawrenceville, GA (US); Rahul Gupta, Duluth, GA (US); Thomas R. Heagy, Jr., Lawrenceville, GA (US); David Lutz, Dacula, GA (US); Aaron Lynch, Atlanta, GA (US); Anthony Owens, Lawrenceville, GA (US); Howard B. Soloway, Broomfield, CO (US); Deborah A. Spencer, Apopka, FL (US); John DeBoard, Lawrenceville, GA (US); Ching F. Wong, Suwanee, GA (US); Yimin Zhang, Roanoke, VA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 595 days.

(21) Appl. No.: 10/789,191

(22) Filed: Feb. 27, 2004

(65) Prior Publication Data
US 2005/0193422 A1 Sep. 1, 2005

(51) Int. Cl.
*G06F 17/30* (2006.01)
(52) U.S. Cl. .......................... 707/200; 707/4; 707/102; 707/104.1
(58) Field of Classification Search ............. 707/1, 707/100, 200, 3–5, 102, 104.1, 205; 717/174, 717/177; 705/34, 40; 725/1, 2, 151
See application file for complete search history.

(56) References Cited

U.S. PATENT DOCUMENTS 5,623,666 A * 4/1997 Pike et al. .................. 707/200
6,405,239 B1 * 6/2002 Addington et al. ......... 709/203

OTHER PUBLICATIONS

H. Zhang et al., "Design and Implemention of Broadcast File System on Based DSM-CC Data CArousel Protocol", pp. 929-933, May 2004.*
M. Dowman et al., "Web-Assisted Annotation, Semantic Indexing and Search of Television and Radio News", ACM Library, pp. 225-234, Sep. 5, 2005.*

* cited by examiner

*Primary Examiner*—John Cottingham
*Assistant Examiner*—Cheryl Lewis

(57) ABSTRACT

The present invention is suitable for use in a communications system that downloads applications over a broadcast file system (BFS). An application services interface (ASI) provides the BFS an application file including a configuration file and an image file that are stored in a service manager in set-tops. Additionally, the ASI provides the BFS a content file that is included in the application file. The provided content file is separated into service files, where each service file is associated with a particular service. When a set-top requests a service, the associated service file is subsequently loaded onto the set-top. Alternatively, a service file is stored in memory until such time as another service is requested, which at that point the older service file is removed from memory to allow space for the newly requested service file.

9 Claims, 6 Drawing Sheets

METHOD OF DISTRIBUTING CONTENT INFORMATION OVER A BROADCAST FILE SYSTEM

FIELD OF THE INVENTION

The present invention relates generally to the field of communications system, and more specifically towards distributing content included in an application over a broadcast file server included in the communications system.

BACKGROUND OF THE INVENTION

Cable communications systems typically transmit program streams to subscribers on-demand. For example, a user may choose to view a video program, which is stored in a headend server, on demand by selecting from a list of available stored programs. A set-top device receives the select commands from the user and sends a signal via the distribution network requesting the program from the headend server. Subsequently, the selected video program along with the application file is transmitted from the server to the set-top. It will be appreciated that since there can be many different on-demand applications, the overall application is known in the art as an xOD application that includes several different services.

More specifically, the xOD application's content file is a large file that includes sometimes upward to 30 separate on-demand service files for loading and playing on a set-top. The application's content file generally includes configuration information for controlling a system manager located in the set-top and images. Conventionally, during the initial download of the xOD application and its content file, the entire xOD application (i.e., the entire application including all services) is downloaded to the set-top. This requires extensive memory residing in the set-top to store the application and the data. Accordingly, limited information can only be available in the application without adversely affecting performance of the application. Additionally, the download results in a detectable delay from the time the user requests the application and the time the application takes to launch a service on the set-top. There is a need, therefore, for improving the downloading of the xOD application and the content file to the set-top.

DETAILED DESCRIPTION OF A PREFERRED EMBODIMENT

The present invention will be described more fully hereinafter with reference to the accompanying drawings in which like numerals represent like elements throughout the several figures, and in which an exemplary embodiment of the invention is shown. This invention may, however, be embodied in many different forms and should not be construed as being limited to the embodiments set forth herein; rather, the embodiments are provided so that this disclosure will be thorough and complete, and will fully convey the scope of the invention to those skilled in the art. The present invention is described more fully hereinbelow.

The present invention is suitable for use in a communications system that distributes applications including large content files. Advantageously, by efficiently distributing the content file and an xOD application to the set-tops in accordance with the present invention, the launch time is significantly shortened. Also, the set-top memory is relieved of some of its storage requirements for the application, thereby allowing more efficient use of available storage.

Figure 1:
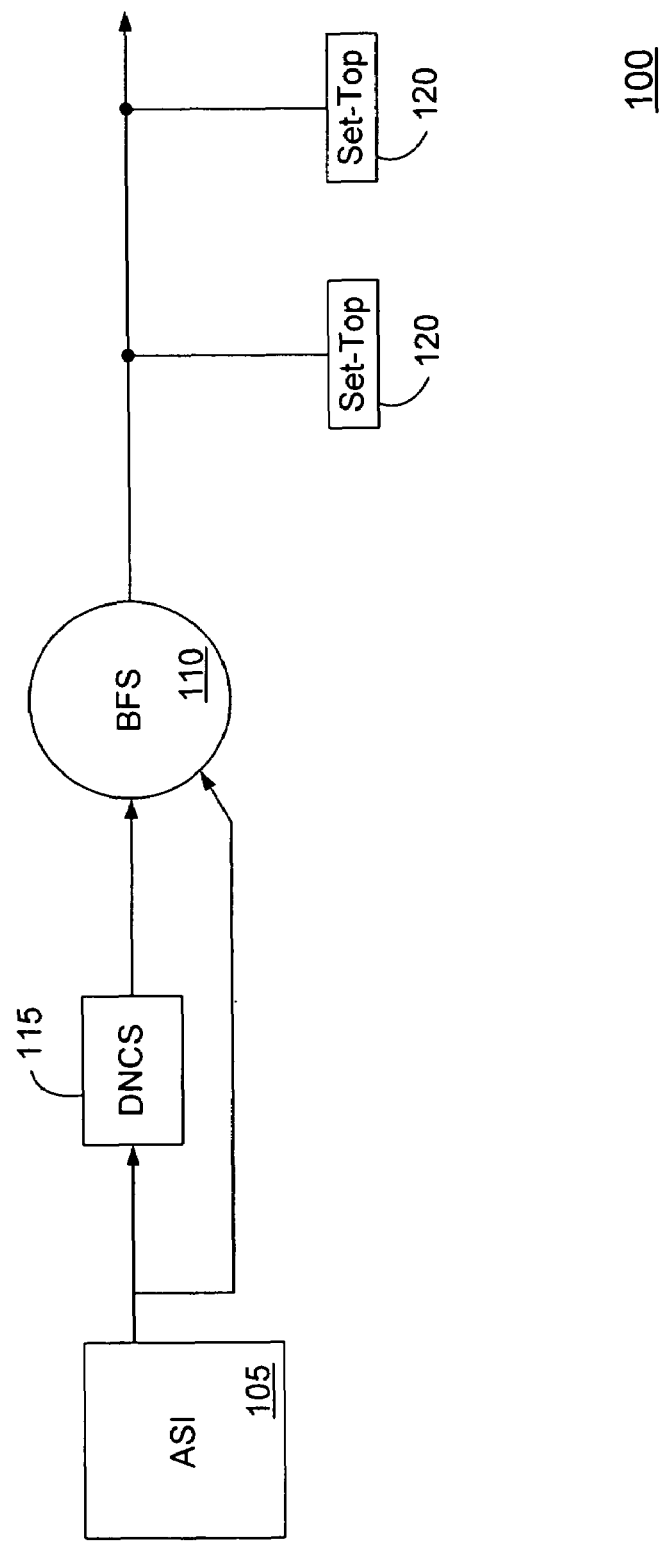
FIG. 1 illustrates a simplified diagram of a communications system that is suitable for use in implementing the present invention.

FIG. 1 illustrates a simplified diagram of a communications system 100 that is suitable for use in implementing the present invention. An application services interface (ASI) 105 supplies the xOD application and data to a broadcast file server (BFS) 110. The BFS 110 then transmits the application and data in a carousel fashion downstream in the system 100. Set-tops 120, depending upon their need, then accept and load the readily available application from the BFS 110. Additionally, a DNCS 115 is responsible for maintaining an accurate list of all set-tops 120 in the system and what each of their levels of service comprises. For example, some set-tops 120 may have a level of service that includes the pay cable channels, such as HBO and Showtime, and other set-tops 120 may purchase on-demand programs on a per instance charge. Accordingly, the DNCS 115 is the interface between the set-tops 120 and a billing server to ensure proper billing for the set-tops 120 in the system 100.

In the present invention, the ASI 105 provides the BFS 110 the xOD application file including the configuration and image files and the content file that has been configured or segmented into sections. As previously mentioned, the conventional way for a set-top 120 to launch an xOD application is to load the application and the entire content file when received from the BFS 110. It can be appreciated that loading the entire xOD content file causes a significant delay in the response time that is noticeable to the user. Additionally, once the content file is loaded and stored on the set-top 120, a large portion of the memory is consumed. Advantageously, by segmenting the xOD content file by each service, the set-top 120 only loads the service that is necessary to satisfy the request.

Figure 2:
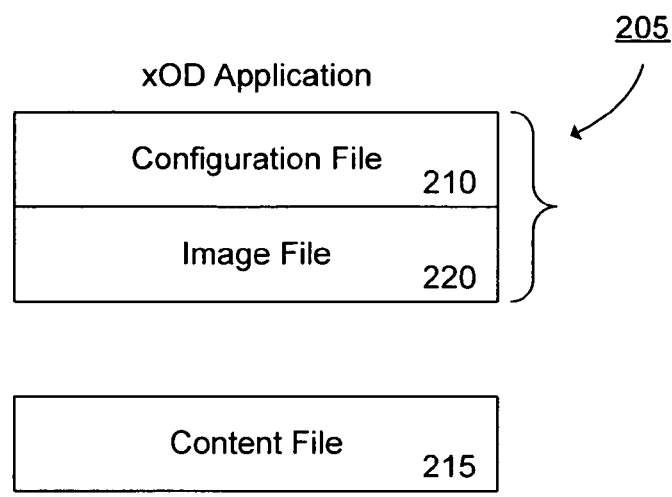
FIG. 2 shows a table illustrating the main components of an xOD application.

FIG. 2 shows a table illustrating the main components comprising an xOD application. The xOD application 205 typically includes a configuration file 210, which includes a total movie and/or program count and the size of each service in a content file and an image file 220 containing information regarding images included in a content file including a timestamp, the file size, and the number of images. Also illustrated is a content file 215 that includes the data for each xOD service. Each service file includes, for example, the actual programs and their associated title. In accordance with the present invention, the configuration file 210 and the image file 220 are loaded off the BFS 110 and stored in the set-tops 120 upon request by a user. Alternatively, if there are any updates to the xOD application, the set-top 120 will load the configuration file 210 and the image file 220 when it boots up. The content file 215, however, is handled in a different manner in accordance with the present invention and is discussed hereinbelow.

Figure 3:
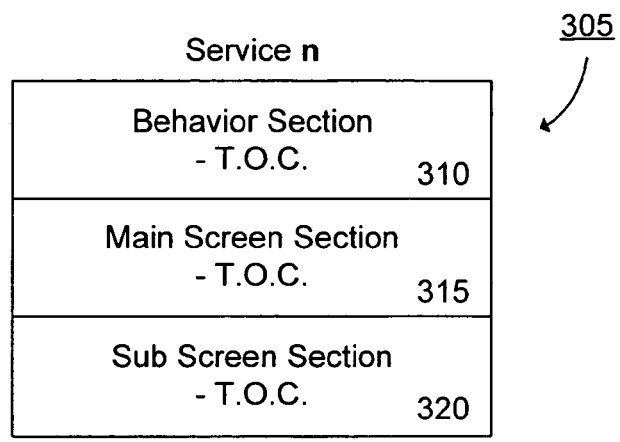
FIG. 3 illustrates one service file included in a content file of the xOD application of FIG. 2.

FIG. 3 illustrates one service file included in the content file 215. As mentioned, the content file 215 is configured into a plurality of service files by the ASI 105 depending upon how many services and their associated sizes are offered in the application. In accordance with the present invention, only one service file 305 that is associated with a requested service is loaded on the set-top 120. Advantageously, the entire content file 215, which may comprise, for example, thirty (30) different services, is not downloaded onto the set-top 120, thereby decreasing the disruption in viewing and also not requiring as much set-top memory. It is known in the art that the service file includes a behavior section 310, a main screen section 315, and a subscreen section 320. Each section then contains a table of contents in order for the set-top 120 to locate necessary objects in each section.

Figure 4:
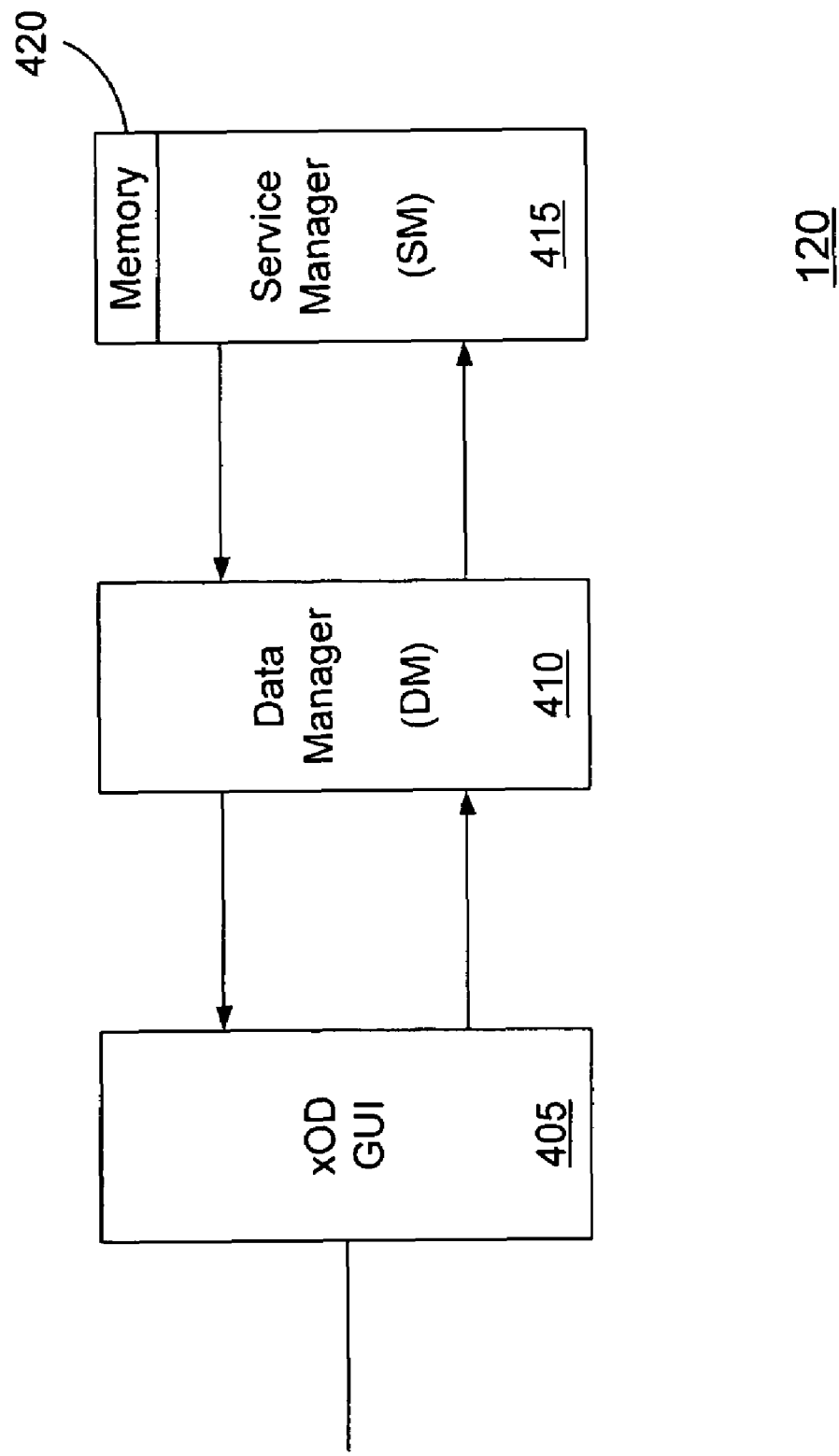
FIG. 4 illustrates selected components and their interaction included in the set-top that are suitable for use in implementing the present invention.
Figure 5:
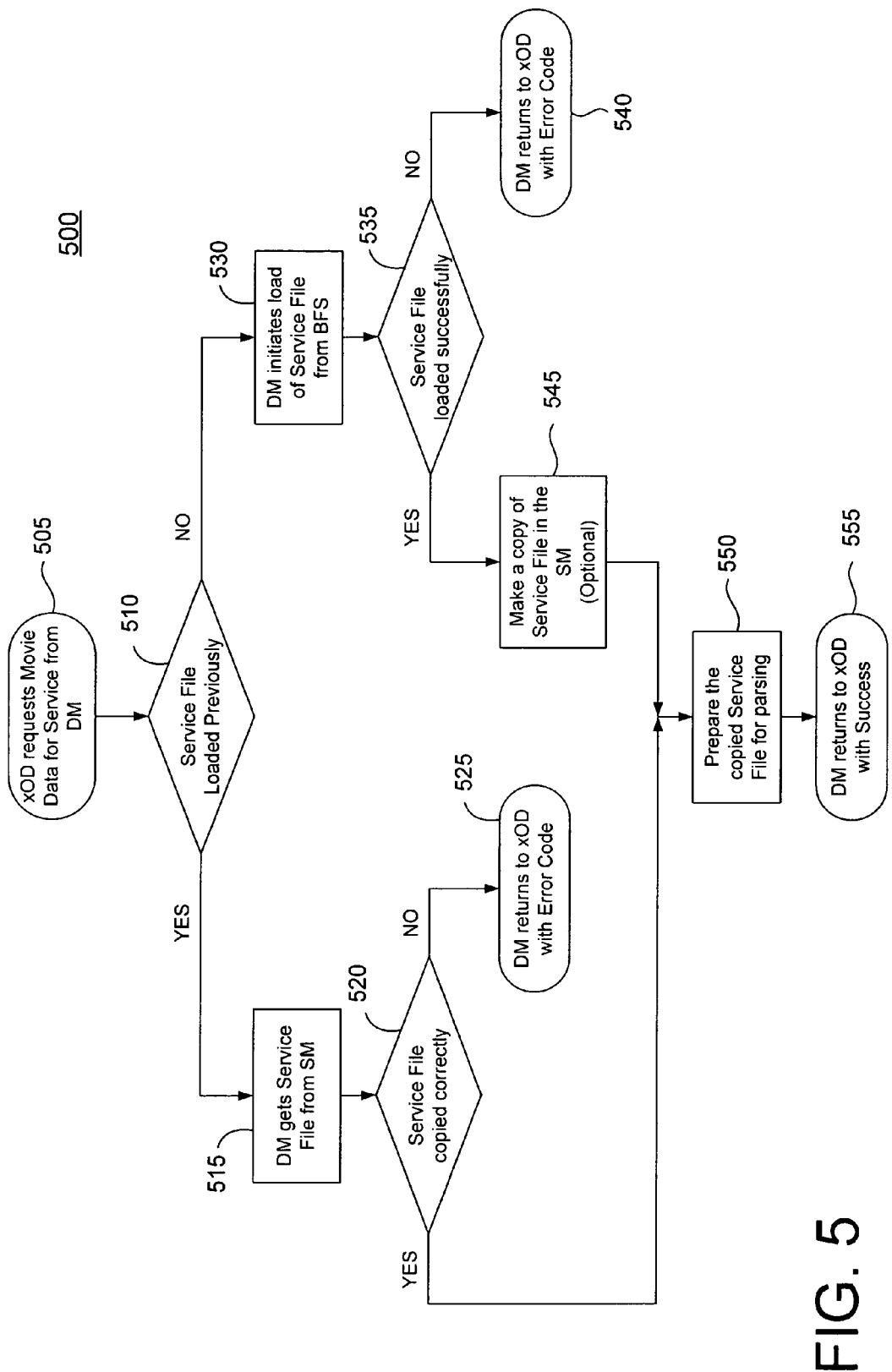
FIG. 5 illustrates a flow chart of steps of a set-top retrieving a service file, e.g., on-demand movies, in accordance with the present invention.

FIG. 4 illustrates selected components and their interaction included in the set-top 120 that are suitable for use in implementing the present invention. FIG. 5, in conjunction with FIG. 4, illustrates a flow chart of steps taken by a set-top 120 retrieving a service file 305, e.g., a service including an on-demand movie, in accordance with the present invention. An xOD graphics user interface (GUI) 405 initiates the process 500 by sending a request for a content file in step 505. A data manager (DM) 410 receives the request and then queries a Service Manager (SM) 415 on the status of the requested service in step 510. Specifically, the DM 410 queries whether or not the SM 415 has the requested service stored in memory 420. If so, then in step 515, the DM 410 retrieves the service from the SM 415. The DM 410 verifies that the service file 305 is correct in step 520. If there are errors, in step 525, the DM 410 provides an error code to the xOD GUI 405.

If, however, the SM 415 does not have a copy of the requested service file 305 stored in memory 420, the DM 410 initiates a load of the specific service file 305 in step 530. Accordingly, when the set-top 120 receives the next requested service file 305 from the BFS 110, the service file 305 is loaded. It will be appreciated that the set-top 120 disregards all other service files being transmitted by the BFS 110. In step 535, the DM 410 determines whether or not the service file 305 was loaded successfully. If not, in step 540, the DM 410 provides an error code to the xOD GUI 405. If the service file 305 was loaded successfully, an optional copy is compressed and stored in the SM 415 in step 545. In step 550, the DM 410 prepares the service file 305 for parsing into node lists (i.e., the behavior section 310, the main screen section 315, and the subscreen section 320). The parsed data is extracted from the compressed copy and subsequently uncompressed to provide the node list. The unparsed data remains in memory 420. The node list is necessary to convert the data contained in the service file 305 into a displayable movie. The DM 410 then sends a success code to the xOD GUI 405 in step 555.

The size of the memory 420 is determined by the initial loading of the configuration file. As mentioned, included in the configuration file is the size of each service file. Accordingly, the size of the memory is at least as large as the size of the largest service file. The memory can be changed at any time depending upon the configuration file. For example, if a service is added that is larger than the previously allocated memory, a revised configuration file is transmitted to the set-tops 120 and loaded upon initialization of the xOD application or when the set-top 120 boots. The change reflected in the configuration file then updates the size of the memory to accommodate a larger service file. Additionally, in accordance with the present invention, the memory 420 includes a private heap, which is a portion of the memory 420 that is dedicated to the parsed data in a current service file that is presented to the user. The private heap organizes and stores the data when portions of the service file are pulled from memory. Advantageously, the private heap reduces memory fragmentation and ensures that there is enough memory for a single service file.

When a second service file is requested, the process 500 is repeated by providing a request for the service file from the SM 415. If the service is not currently in memory 420, the DM 410 initiates a load of the service from the BFS 110. Consequently, the SM memory 420 may not have adequate room for the storage of another service file. In which case, the SM 415 determines which service(s) is the least recently used service in memory 420. This service(s) is then removed to allow space for the latest requested service, and process 500 continues.

Figure 6:
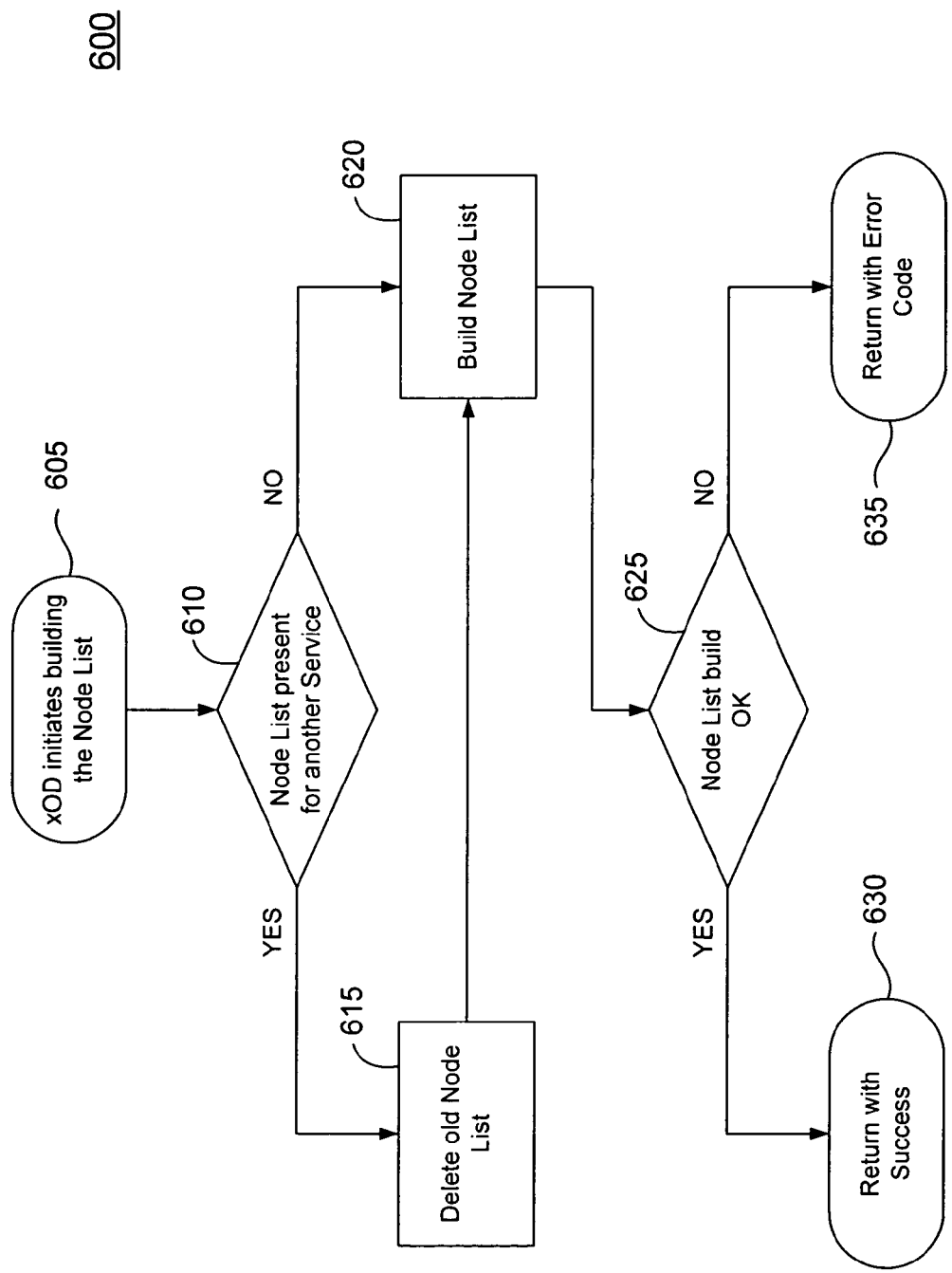
FIG. 6 illustrates a process for building the node list in accordance with the present invention.

FIG. 6 illustrates a process for building the node list in accordance with the present invention. The xOD GUI 405 initiates the process 600 in step 605. In step 610, it is determined whether or not a node list is present for a previous service. If yes, then the old node list is deleted in step 615. If not, and subsequent to step 615, the new node list is built in step 620. The node list is verified for correction in step 625. If the node list is correct and ready for presenting to the viewer, a success code is returned in step 630. If not, an error code is returned in step 635.

It will be appreciated that modifications can be made to the embodiment of the present invention that is still within the scope of the invention. Additionally, the present invention can be implemented using hardware and/or software that are within the scope of one skilled in the art. The embodiments of the description have been presented for clarification purposes; however, the invention is defined by the following claims.

What is claimed is:

1. A method of providing an application to a set-top over a broadcast file system (BFS), the application including a configuration file, an image file, and a content file, the method comprising the steps of:

segmenting the content file into a plurality of service files according to each service;

providing the configuration file, the image file, and the plurality of segmented service files to the BFS, wherein all of said files included in the application are continuously transmitted to the set-top;

loading the configuration file and the image file on the set-top;

upon request for a service by a user, loading one service file included in the plurality of service files that is associated with the requested service;

storing the requested service file in memory;

displaying the requested service file to the user;

upon request for a second service, determining available memory capacity;

if capacity exists, storing the second requested service in memory; and if there is not enough capacity, determining from the currently stored services the least used service, and deleting the least used service prior to storing the second requested service.

2. The method of claim 1, wherein an application services interface (ASI) segments the content file into the plurality of service files.

3. The method of claim 1, further comprising the steps of, prior to loading the requested service file onto the set-top, checking memory included in the set-top for a stored copy of the requested service file, and wherein, if stored in memory, displaying the stored service file to the user and not loading the requested service file.

4. The method of claim 1, further comprising the step of, prior to storing the second requested service in memory, checking memory for a stored copy of the second service.

5. A method of providing an application to a set-top over a broadcast file system (BFS), the application including a configuration file, an image file, and a content file, the method comprising the steps of:
- segmenting the content file into a plurality of service files according to each service;
- providing the configuration file, the image file, and the plurality of segmented service files to the BFS, wherein all of said files included in the application are continuously transmitted to the set-top;
- loading the configuration file and the image file on the set-top;
- upon request for a service by a user, loading one service file included in the plurality of service files that is associated with the requested service;
- storing the requested service file in memory; and
- displaying the requested service file to the user,
- wherein the configuration file includes information regarding memory size associated with the service file having the most memory requirement, and wherein a private heap is allocated having adequate memory space to store the service file having the most memory requirement.

6. The method of claim 5, wherein the private heap is updated by the configuration file when a service file having a greater memory requirement is added to the content file.

7. The method of claim 5, further comprising the steps of, prior to loading the requested service file onto the set-top, checking memory included in the set-top for a stored copy of the requested service file, and wherein, if stored in memory, displaying the stored service file to the user and not loading the requested service file.

8. The method of claim 5, further comprising the steps of, upon a request for a second service by a user, checking memory for a stored copy of the second service, wherein, if a copy of the second service does not exist in memory, loading the second requested service from the BFS.

9. The method of claim 8, further comprising the steps of:
- determining available memory capacity;
- if capacity exists, storing the second requested service in memory;
- if there is not enough capacity, determining from the currently stored services the least used service, and deleting the least used service prior to storing the second requested service.

* * * * *